Patented July 16, 1940

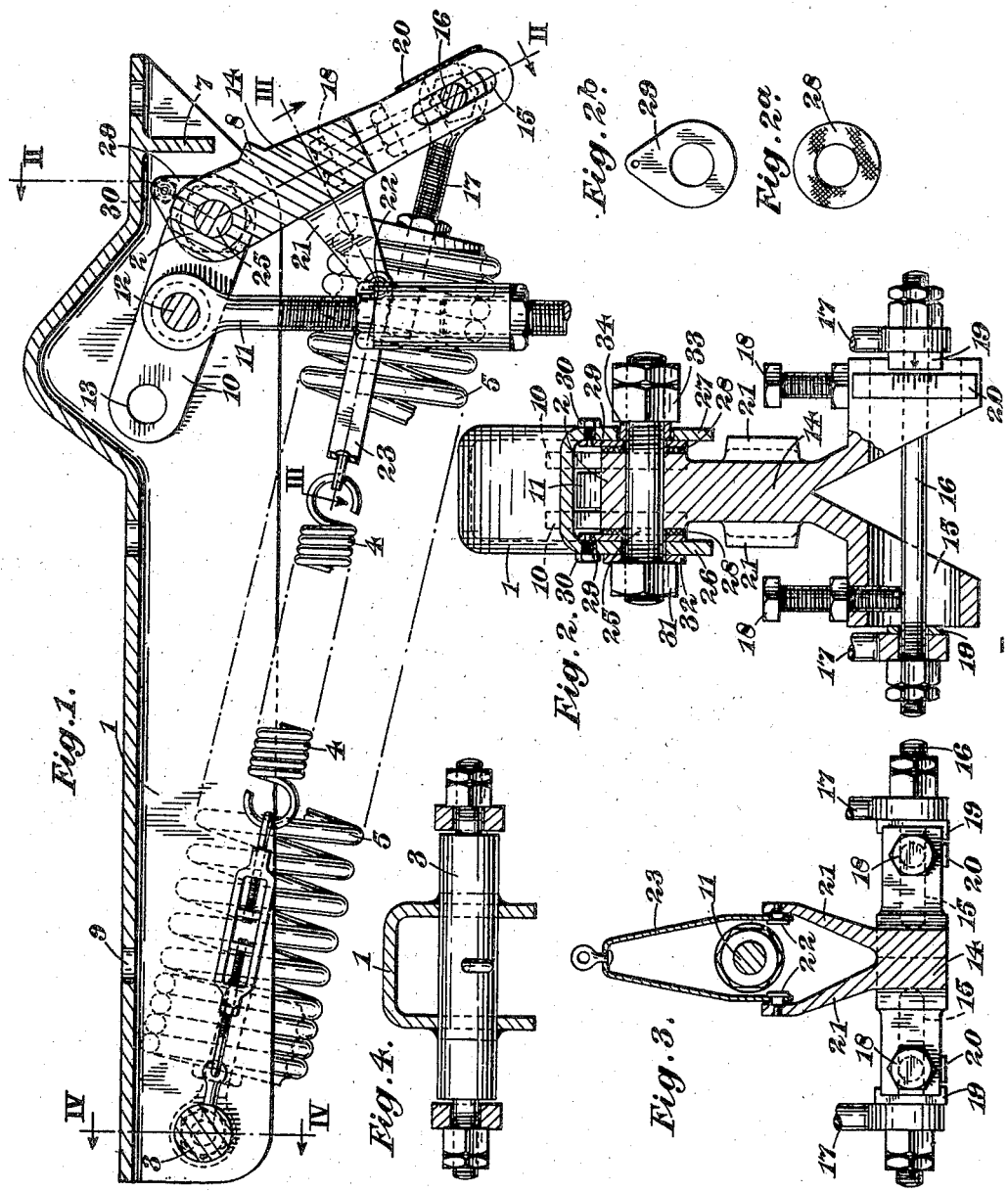

2,208,064

UNITED STATES PATENT OFFICE 2,208,064

SPRING DEVICE

Joseph Kaye Wood, New York, N. Y.

Application December 23, 1936, Serial No. 117,265
In Great Britain December 23, 1935

3 Claims. (Cl. 248—54)

This invention relates to hanger supports comprising springs or other resilient elements.

In many cases in industry it is necessary or desirable to support on hangers heavy apparatus which is to be moved up and down relative to its support and to be left for various periods at various positions or moved gradually within a limited vertical range. Thus, for example, in high temperature equipment such as steam piping, condensers, oil refinery equipment, and various high temperature chemical engineering equipment it is necessary to support heavy parts of the apparatus with allowance for expansion and contraction; in the pumping of high columns of liquids, e. g., oil from deep wells, it is desirable to counterbalance the weight of the piston and piston rod and column of oil, in the handling of scenery both on the stage and in the filming of motion pictures heavy objects may be required in the scene for a short time and then to be moved quickly to another location, supporting these from hangers such as are herein described permits their handling by one or few men; similarly with heavy apparatus in process of manufacture, often it is necessary to move it into position for machinery or assembling, such movements if made by a supporting crane, etc., are delicate mechanical operations, whereas with counterbalancing hangers such as are described herein, even the heaviest apparatus can be moved by hand for accurate positioning.

Two difficulties have been experienced with support hangers which have seriously restricted their satisfactory application for such purposes. In the first place, it is found that the friction which necessarily exists in most hanger support devices is added to the supporting force when the load moves upward, so that a support which statically is correct is out of balance when it is moving. In the second place, it is found that a yieldable support permits and may even accentuate oscillations where, as is often the case, such devices are required to operate in places where there is considerable vibration, as for example in land or marine power plants, pumping apparatus, machining operations, etc.; and experience has shown that oscillations of the supported equipment are liable to build up under these conditions to dangerous amplitude.

The nautral vibration period of the device and that of the supported load are, of course, in general fairly long, but sympathetic oscillations may be set up either by a vibration of the same period, which may occur for example in the case of a ship at sea, or by a vibration of shorter period constituting a higher harmonic.

In order to avoid such objectionable conditions in supporting devices of this kind, according to the present invention, I combine with the resilient elements in the supporting device some means for damping oscillations, as for example friction devices, hydraulic or pneumatic leakage-flow devices (dashpots), plastic flow devices, hysteresis cushions such as rubber, cork, etc.

In such devices it will be realized that one effect of using a damping device of the "solid" friction type, as opposed to fluent friction, is to increase the static friction, with the result that the undesired variations in the supporting force, which cannot in any case be entirely eliminated, are increased. Solid friction devices have, however, the great advantage of cheapness, and, provided the friction is kept well adjusted to adequate damping, they give good results in practice.

When a load is free from vibration, ordinary sliding friction between the solid parts of its supporting devices is objectionable because it introduces a resistance which is added to the supporting force upon movement in one direction and subtracted from it upon movement in the opposite direction. This gives, when supporting force is plotted against travel, a loop which rises above the condition of balance with movement in one direction and falls below it during travel in the opposite direction. This I shall call the "hysteresis loop."

I have observed, however, that any oscillation of the load or the hanger alters this condition by an action which is comparable to the effect of electrical oscillations upon the passage of electrical current through a resistance or a condenser. Depending upon the frequency and amplitude of the oscillations the spread between the upper and lower sides of the hysteresis loop can be substantially eliminated. The ideal condition is that in which this spread is exactly or almost eliminated, i. e., in which the amount of friction is approximately sufficient to absorb the energy of the given oscillation, and the energy of the oscillation is approximately sufficient to eliminate the hysteresis loop.

With given amplitude a higher frequency will permit and require higher friction, with a given frequency a greater amplitude will permit and require greater friction. Thus, with any system which is subjected to oscillations in a limited range of energy values, depending upon frequency and amplitude, a definite friction value can be determined which should be provided in the device for damping the oscillations without destroying the effectiveness of the support; and vice versa with a given friction in the supporting device a definite energy of oscillation can be determined, by which the hysteresis loop can be eliminated. Thus, these two objectionable effects are, according to my invention eliminated simultaneously.

It should be understood, of course, that in thus referring to friction I include both the friction of solid surfaces rubbing on one another and also the friction of fluid and plastic flow, including both internal friction and "skin-friction," i. e., the friction of the fluent material on a solid surface which confines or directs its flow. The friction of fluid and plastic flow which I shall refer to generally as "fluent friction," has, however, a special characteristic not present in the friction of solid surfaces—a tendency to increase its resistance to the flow as the velocity of flow is increased.

In apparatus which is subjected to varying and indeterminable vibrations, as well as in apparatus which is often substantially free from vibrations the simple balancing of solid friction against vibrational energy is not possible. In these cases I have found that a device using fluent friction should be chosen for damping vibrations. In such devices, the characteristic that their resistance increases with the velocity of movement, gives to them an automatic adjustment for various frequencies. Similarly, solid friction can be used if in a device which responds to variation of velocity to vary the area or pressure of friction contact.

An improvement may be effected by using a friction material which gives a co-efficient of friction which rises as the rubbing velocity increases. A material having this characteristic has recently been developed for use in automobile shock absorbers and is known by the name "Rubber-Flow" material. Such a material, although solid, has on its surface a layer of material which when rubbed under pressure, behaves like a plastic, so that the friction depends upon velocity of movement as well as upon pressure and surface characteristics.

By way of example, a friction device according to the invention is shown in the accompanying drawing applied to a pipe hanger operating in accordance with the principles set forth in my prior application, Serial No. 20,511, filed May 9, 1935.

Fig. 1 shows a longitudinal section through the device.

Fig. 2 is partly a section along the line II—II in Fig. 1 and partly an elevation.

Figs. 2a and 2b show details of the friction device.

Figs. 3 and 4 are sections along the lines III—III and IV—IV respectively in Fig. 1.

The device shown in the drawing comprises a frame 1 of channel section carrying at one end a bell-crank lever 2 and at the other end a bar 3 passing through the flanges and serving as an anchorage for a booster spring 4 lying between the flanges, and for two main springs 5 arranged outside the flanges. The frame is provided with a raised portion 6 permitting the desired travel of the lever 2 in one direction and an abutment 7 which cooperates with an abutment 8 on the lever and limits the movement of the latter in the other direction. The frame is also provided with suitably spaced holes 9 for securing the device in position.

The arm 10 of the bell-crank lever is double, the two sides receiving between them an eyebolt 11 through which the supporting force is applied to the equipment to be supported. The sides are provided with alternative holes 12 and 13 for the pin passing through the eyebolt in order to accommodate the device to different loads.

The other arm 14 of the bell-crank lever is forked at its lower end and the arms of the fork are provided with transverse slots to receive a pin 16 passing through eyebolts 17 connected to the main springs 5. The position of the pin 16 in the slots 15 is determined by adjusting bolts 18, and to facilitate accurate setting, indicators 19 are provided which slide on the arm 14 of the lever and are carried by the pin 16. The indicators 19 cooperate with fixed indicators 20 mounted on the lever.

The arm 14 of the lever is further provided with forked extension arms 21 carrying pivot pins 22 on which are mounted the ends of a stirrup 23 connected to the booster spring 4. The purpose of the arms 21 and stirrup 23 is to provide clearance for the load eyebolt 11. The other end of the booster spring 4 is connected to the bar 3 through a turnbuckle 24 which may also be provided with indicating means for facilitating correct adjustment.

The arrangement of the lever and springs is carried out in accordance with the principles set forth in specification No. (application No. 20,511), that is to say the lever and main springs 5 are so adapted to one another that acting in combination they produce a load/deflection characteristic which rises to a maximum at a position of the lever lying about midway between its mean position and the limit of its movement in the clockwise direction. The booster spring 4 is then so arranged that it remains slack until the lever reaches about its mean position, and thereafter causes the load/deflection characteristic of the device as a whole to rise to a second maximum when the lever is about midway between its mean position and the limit in the anti-clockwise direction.

In this example the friction device constituting the chief feature of the present invention is incorporated in the pivotal mounting of the bell-crank lever. A pivot pin 25 passes through the lever and through the two flanges 26 and 27 of the frame 1, see Fig. 2. Between the lever and each of these flanges is arranged a washer 28 of friction material, see Fig. 2a, and a metal spacing washer 29, see Fig. 2b. The metal washers 29 are fixed against rotation relatively to the frame by screws 30. One end of the pivot pin 25 is provided with a head 31 bearing against the flange 26 with the interposition of a spring washer 32, and the other end is provided with a nut and lock-nut 33 bearing against a sleeve 34 axially movable in the opening in the flange 27 and bearing against the metal washer 29. It will be readily appreciated that tightening or loosening the nut 33 varies the pressure between the friction washers and the lever and permits the frictional damping effect to be adjusted.

The friction washers 28 may be made of vulcanized fibre to give solid friction where limited oscillation is experienced or of a plastic-flow friction material, for example the "Rubber-Flow" material already referred to, where varying conditions of oscillation are encountered. Discs of "Rubber-Flow" material are commercially available under that name, from the John Warren Watson Company of Philadelphia. These discs are made of woven fabric cemented together by a binder and quite similar to brake lining and clutch facing materials in common use and are provided on their surface with a thin layer of plastic friction material.

Instead of these friction discs, an hydraulic or pneumatic dashpot device may be connected, e. g., to the bell-crank lever 14, or other friction or leakage-flow or plastic flow device can be used. With leakage-flow devices an adjustable orifice may serve the adjusting function instead of the nut 33 in the example shown, or in any case a change in the mechanical advantage between the load and the damping device may provide the necessary adjustment.

I have referred above to the utilization of any oscillation to which the load is subject to overcome the hysteresis loop; and I have mentioned increasing or supplementing the natural friction of the hanger if necessary to absorb the vibration energy. In some cases, however, the condition is reversed and it may be necessary or desirable to introduce additional vibration to cure the hysteresis loop effect.

Thus for example I have effectively applied to the hanger a small, preferably high speed, electric motor carrying on its shaft an eccentric weight. By suitable choice of the mass of the eccentric weight and the speed of rotation a vibration can be set up in the hanger which is just sufficient to eliminate the hysteresis loop and which will be damped by the natural friction of the hanger without transmission to the load. Another means for achieving a similar result is to mount an alternating current magnet above the left-hand end of the hanger shown in Fig. 1, so as to introduce a 60 cycle vibration.

It is also possible in a system free from vibration, to correct the hysteresis loop by a supplemental force member acting only in one direction of movement with a force equal to the total width of the hysteresis loop or more advantageously acting in opposite directions with movement to opposite sides of the static support value (i. e., the center line of the hysteresis loop). Such a device may, for example, be an electric motor, advantageously a constant torque motor or a solenoid, controlled by a switch responsive to small increase or decrease in the pull exerted between the load and the hanger. Such a switch may be designed to disconnect the solenoid under static conditions and to connect it reversely when the load moves up or down respectively. Or the hanger may be designed to give support equal to the load plus or minus the amount of the friction effect. Or the motor may act to apply to or lift off from the support device a counterweight in which case it is not essential to have the torque of the motor accurately controlled.

If the support is minus the friction effect then supporting force plus friction will always prevent the load from dropping until some external force is applied (or some vibrational energy), upon application of an upward force no lift would occur until the force exceeded twice the amount of the friction except for the supplemental lifting motor which, by means of contacts responsive to a very slight reduction of the load, becomes effective to add an upward pull equal to twice the friction effect. The control contacts should, of course, be in the connection (e. g., 11 in Fig. 1), which is unaffected by friction. A stiff resilient member in this connection may be adjusted to the load so that upon any variance of the load it extends or retracts to open or close the contacts.

If the support is plus the friction the action is similar except that the load is moved up directly upon any reduction in the load or an application of any upward force, whereas upon increase in the load contacts are closed to add the force of the motor equal to twice the friction effect.

What I claim is:

1. A support for high temperature piping which comprises resilient means for exerting a force for support of the means including a bell crank lever for varying the mechanical advantage between the resilient means and the load to maintain approximately constant supporting force on the piping throughout a substantial range of vertical movement, and means for absorbing energy of vibration of the pipe induced by external forces comprising a friction material interposed between the lever and the frame, the frictional energy loss therein being approximately equal to the energy of oscillatory movement between the load and fixed support, whereby the hysteresis effect of the friction means may be substantially overcome by the oscillations, and movements of the load are thereby permitted without excessive variations of force on the load.

2. A support for high temperature piping as described in claim 1, in which there is provided adjustable means to vary the pressure on the friction material between the frame and lever.

3. A support for high temperature piping which comprises resilient means for exerting a force for support of the piping including a bell crank lever for varying the mechanical advantage between the resilient means and the piping throughout a substantial range of vertical movement and friction material disks interposed between the bell crank lever and the frame to absorb the energy of vibration of the pipe induced by external forces, the frictional energy loss being approximately equal to the energy of oscillatory movement between the load and fixed support, whereby the hysteresis effect of the friction means may be substantially overcome by the oscillations, and movements of the load are thereby permitted without excessive variations of force on the load.

JOSEPH KAYE WOOD.